US009002699B2

(12) United States Patent
Qin

(10) Patent No.: US 9,002,699 B2
(45) Date of Patent: Apr. 7, 2015

(54) ADAPTIVE INPUT LANGUAGE SWITCHING

(75) Inventor: Lijuan Qin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 629 days.

(21) Appl. No.: 13/295,877

(22) Filed: Nov. 14, 2011

(65) Prior Publication Data

US 2013/0124187 A1 May 16, 2013

(51) Int. Cl.
G06F 17/28 (2006.01)
G06F 3/01 (2006.01)
G06F 3/0484 (2013.01)
G06F 17/27 (2006.01)

(52) U.S. Cl.
CPC .............. G06F 3/01 (2013.01); G06F 3/0484 (2013.01); G06F 17/275 (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ........................................................ 704/2–8
See application file for complete search history.

(56) References Cited

U.S. PATENT DOCUMENTS 7,185,289 B1 * 2/2007 Taima ........................... 715/810
7,366,984 B2 4/2008 Robbins
7,411,582 B2 8/2008 Toepke
7,444,278 B2 10/2008 Bennett
7,562,007 B2 7/2009 Hwang
7,822,434 B2 * 10/2010 Scott et al. ................. 455/550.1
7,973,764 B2 7/2011 Kim
2004/0085370 A1 5/2004 Cibelli et al.
2004/0260536 A1 * 12/2004 Hwang ............................. 704/9
2005/0240756 A1 * 10/2005 Mayer ............................ 713/2
2007/0128899 A1 * 6/2007 Mayer ......................... 439/152
2007/0265828 A1 * 11/2007 Scott et al. ....................... 704/9
2008/0077393 A1 * 3/2008 Gao et al. ........................ 704/8
2008/0115072 A1 5/2008 Lu
2008/0177994 A1 * 7/2008 Mayer ............................ 713/2
2008/0178106 A1 * 7/2008 Awada et al. ............... 715/765

(Continued)

FOREIGN PATENT DOCUMENTS

WO WO 2011/004367 1/2011

OTHER PUBLICATIONS

MSDN "Working with the Input Method Editor," <http://msdn.microsoft.com/en-us/library/aa912526.aspx>, 1 page, Retrieved Date: Sep. 7, 2011.

(Continued)

Primary Examiner — Lamont Spooner
(74) Attorney, Agent, or Firm — Bryan Webster; Kate Drakos; Micky Minhas

(57) ABSTRACT

Techniques and solutions are provided for adaptive input language switching. Automatic switching of a current input language can be performed by receiving an indication of a first language of displayed content (where the current input language is set to a second language different from the first language), receiving a selection of a text input area, and based on the selection, automatically switching the current input language from the second language to the first language. Switching of the current input language can also be performed by providing convenient user interface elements for selection by a user to automatically switch the current input language.

19 Claims, 9 Drawing Sheets

(56) References Cited

U.S. PATENT DOCUMENTS

| | | | |
|---|---|---|---|
| 2009/0225041 A1* | 9/2009 | Kida et al. | 345/173 |
| 2009/0287474 A1 | 11/2009 | Chen | |
| 2010/0265183 A1* | 10/2010 | Mail et al. | 345/168 |
| 2011/0029902 A1* | 2/2011 | Bailey | 715/764 |
| 2012/0029902 A1* | 2/2012 | Lu et al. | 704/2 |
| 2012/0226490 A1* | 9/2012 | Mashiah | 704/8 |

OTHER PUBLICATIONS

Microsoft Office "Turn on automatic language options," <http://office.microsoft.com/en-us/outlook-help/turn-on-automatic-language-options-HA010244823.aspx#BM2>, 2 pages, Retrieved Date: Sep. 7, 2011.

Microsoft, "Translator," <http://www.microsofttranslator.com/>, 1 page, Retrieved Date: Sep. 7, 2011.

MSDN Blogs, "Top Sites Going Global with Translator API," <http://blogs.msdn.com/b/translation/archive/2011/10/18/top- sites-going-global-with-translator-api.aspx>, 2 pages, Retrived Date: Oct. 20, 2011.

International Search Report and Written Opinion, corresponding Application No. PCT/US2012/064257, 9 pages, Mar. 28, 2013.

Notice on the First Office Action, Chinese patent Application No. 201210454485.2, 13 pages, Sep. 25, 2014.

\* cited by examiner

ADAPTIVE INPUT LANGUAGE SWITCHING

BACKGROUND

Computers are increasingly capable of utilizing content written in different languages. In addition, computing devices are generally capable of displaying content in a variety of different languages, depending on installed language options. For example, a computer could display web pages with text content in different languages, such as English, Spanish, Chinese, Japanese, etc.

In addition to displaying content in different languages, computers often allow users to enter text using different languages. For example, a user may be working on a Chinese document, and thus enter text in Chinese. The same user may also be working on an English document, and thus enter text in English.

Even though multi-language support is common, switching between different languages for text input can be difficult and time consuming. In some situations, a user who wants to enter text in a different language than that which is currently selected may have to perform a series of manual steps in order switch to the different language. For example, the user may have to access a settings menu, select a language configuration option, select the different language within the language configuration option, and exit the settings menu. If the user needs to change languages frequently, this switching process can be time consuming and inefficient.

Therefore, there exists ample opportunity for improvement in technologies related to input language switching.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for adaptive input language switching. In some embodiments, automatic switching of input language is performed. In other embodiments, convenient user interface elements are provided for switching of input language. For example, adaptive input language switching provides for more efficient switching of an input language without having to manually change input language of a device (e.g., using a settings menu).

According to one aspect of the techniques and tools described herein, a method is provided for switching an input language of a computing device. The method comprises receiving an indication of a first language of text content displayed by the computing device (where a current input language of the computing device is set to a second language that is different from the first language), receiving an indication that a text input area displayed by the computing device has been selected (e.g., by receiving a selection of the text input area from a user), and upon receiving the selection of the text input area, automatically switching the current input language of the computing device from the second language to the first language. After the current input language has been switched, text received by the computing device in the text input area is received using the first language (e.g., using a keyboard configuration and/or language setting corresponding to the first language).

According to another aspect of the techniques and tools described herein, a computing device is provided for switching an input language of the computing device. The computing device comprises a display, a memory, and a processing unit, where the computing device is configured for performing operations comprising receiving an indication of a first language of text content displayed by the computing device (where a current input language of the computing device is set to a second language that is different from the first language), receiving a selection of a text input area from a user of the computing device, and upon receiving the selection of the text input area, automatically switching the current input language of the computing device from the second language to the first language. After the current input language has been switched, text received by the computing device in the text input area is received using the first language (e.g., using a keyboard configuration and/or language setting corresponding to the first language).

According to another aspect of the techniques and tools described herein, a method is provided for switching an input language of the computing device. The method comprises receiving an indication of a first language of text content displayed by the computing device, determining that a current input language of the computing device is set to a second language that is different from the first language, receiving, from a user of the computing device, a selection of a text input area displayed by the computing device, upon receiving the selection of the text input area, displaying a user interface element that is selectable by the user for switching the current input language of the computing device from the second language to the first language, and upon receiving a selection of the user interface element, automatically switching the current input language of the computing device from the second language to the first language. The user interface element for automatically switching the input language can be provided, for example, in proximity to the text input area or at another location (e.g., displayed in a toolbar area).

The foregoing and other objects, features, and advantages of the invention will become more apparent from the following detailed description, which proceeds with reference to the accompanying figures.

DETAILED DESCRIPTION

Figure 1:
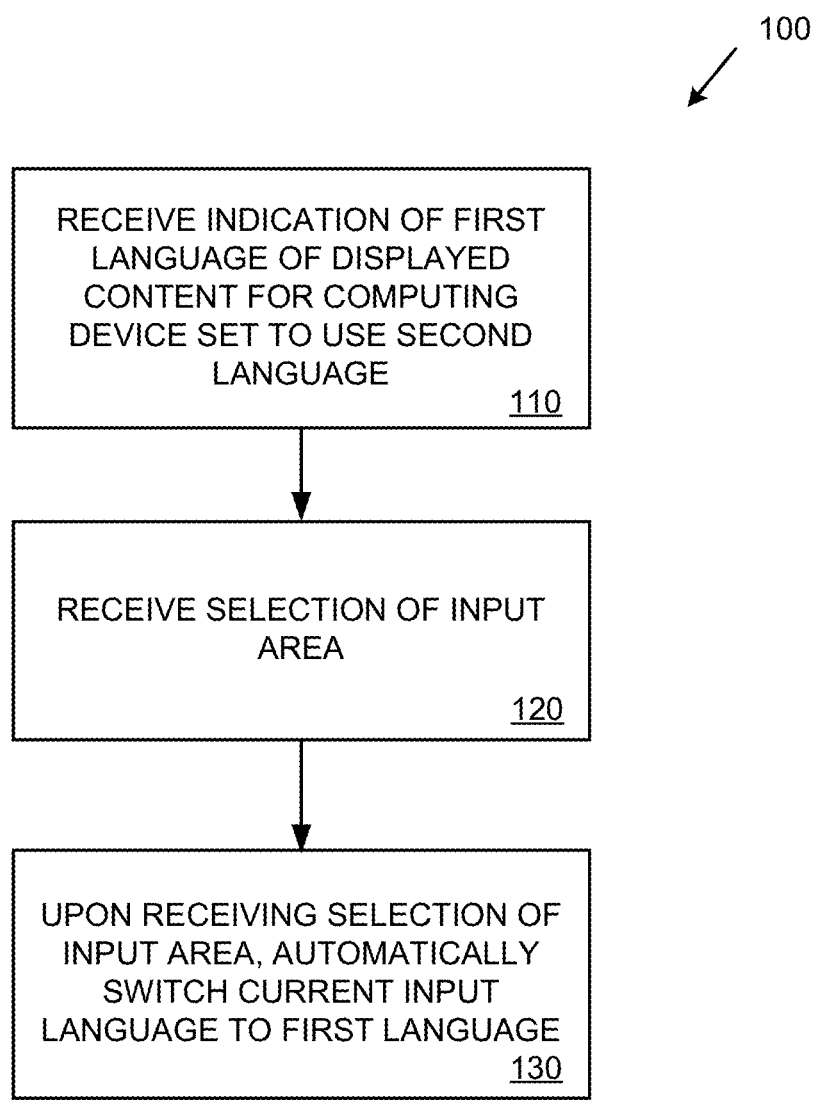
FIG. 1 is a flowchart depicting an example method for switching an input language of the computing device.

The following description is directed to techniques and solutions for adaptive switching of an input language. For example, switching of an input language can be performed by automatically switching the input language on various computing devices, such as desktop computers, laptop computers, tablet computers, smart phones, or any other type of computing device.

Normally, a user of a computing device (e.g., a computer or smart phone) must perform a series of steps in order to change the input language of the device. For example, in order to change the current input language of the computing device, the user may need to manually select a settings program of the computing device, select a language option within the settings program, change the language option to the desired language, and exit the settings program. This series of manual steps may need to be performed each time the user wants to enter text in a language (e.g., a language that uses a different input configuration, such as a different keyboard and/or language setting) other than the language that the device is currently set to use.

In some embodiments, the input language of a computing device is switched automatically (e.g., without the user having to switch the input language manually or select any language switching user interface elements). Automatic switching can be performed when a user of the computing device selects a text entry area associated with a language that is different from the current language setting of the computing device. For example, consider a user that speaks both English and Chinese using a computing device that is currently set to use the English language. If the user visits a search engine web site (where the web site is in Chinese) and clicks in the search entry box, the input language can be automatically switched from English to Chinese so that when the user enters the search query in the search entry box the entry is in Chinese characters.

In some embodiments, the input language of a computing device is switched based on a proposed input language. An input language can be proposed when a user of the computing device selects a text entry area associated with a language that is different from the current language setting of the computing device. For example if the user visits a search engine web site (where the web site is in Chinese) and clicks in the search entry box, a user interface element can be displayed allowing the user to quickly and easily switch the input language from English to Chinese so that when the user enters the search query in the search entry box the entry is in Chinese characters. Providing a convenient user interface element that is proposed or recommended to the user based on the language of displayed text content can reduce the number of actions the user needs to take to change the current input language of the device. For example, manually switching the input language using a settings menu may take three or four actions (e.g., three or four clicks, taps, or selections), while a proposed or recommended user interface element for switching may require only a single action (e.g., a single click, tap, or selection).

Input Language

In the techniques and solutions described herein, input language refers to the language that a computing device will use for text input. The input language can refer to a language configuration (e.g., comprising an indication of a specific alphabet) and/or a keyboard configuration of the computing device. For example, certain languages use different alphabets for inputting text (and thus may need to display a different keyboard or use a different key mapping), and some languages use the same alphabet characters (e.g., Latin alphabet characters) while providing for inputting text in a language other than English (e.g., entering Chinese characters using a Latin keyboard).

The input language that a computing device is currently configured to use is referred to herein as the current input language. The input language is also sometimes referred to as the "input method" of the computing device. In a specific embodiment that uses the Microsoft® Windows® operating system, changing the input language is performed using, at least in part, Input Method Engine (IME) components. In some embodiments, changing the input method can comprise changing a software input panel (SIP) configuration of the device that controls an on-screen keyboard (e.g., of a smart phone or tablet computer).

Computing devices are generally configured to support text input in one or more languages. For example, language packages comprising input language configurations can be installed on a computing device to support text input in different languages.

The input language that a computing device is currently set to use (the current input language) can be changed. For example, the current input language of a computing device can be changed from a first input language (e.g., English) to a second input language (e.g., Chinese). In some implementations, the current input language can be changed to one of the input languages that the computing device is configured to support (e.g., to one of the languages that have been installed on the computing device). In order to determine whether switching to a specific input language is supported, a computing device can check whether the specific input language is installed on the computing device.

The current input language of a computing device is used when entering text content. For example, if a user enters text into a text entry area, then the entered text will use the current input language of the computing device. The current input language of a computing device is also used when text input is received via a keyboard of the computing device. For example, keyboard entry can be mapped to the current input language of the computing device. Furthermore, an on-screen keyboard (e.g., on a smart phone or tablet computer) can be displayed using the current input language (e.g., the displayed keys can be in the current input language alphabet).

Text Content

In the techniques and solutions described herein, the language of text content displayed by a computing device can be determined. For example, a computing device can determine the language of text content displayed by a web browser application, a chat application, an instant message application, a word processing document, a presentation document, or another type of application that displays text content.

Displayed text content can be associated with a text input area. Examples of text input areas include text entry fields or boxes on web pages, entry fields in instant message or chat applications, word processing documents, presentation documents, and any other area where a user can enter text content via a computing device.

A user can select a text input area. For example, a web page that contains text content as well as a text input field (e.g., for entering a search query for a search engine site) can be displayed. In some implementations, when the web page is displayed, the text input field is not selected (i.e., if the user starts typing, it will not enter text into the text input field because it is not selected, or does not have focus). If the user wishes to enter text into the text entry field, the user can select (e.g., click or tap) the text input field, which typically places a cursor into the text entry field indicating text will be entered in the field when the user types. In other implementations, when the web page is displayed, the text input field may be automatically selected.

Automatic Switching of Input Language

In the techniques and solutions described herein, the current input language of a computing device can be automatically switched. For example, a current input language of a computing device can be automatically switched (e.g., without the user having to manually change a language setting of the computing device) from a first language to a second language.

The current input language of the computing device can be automatically switched based on detecting a language of displayed content. For example, the computing device can have a current input language set to a specific language, such as English. The user of the computing device may then display content in a different language, such as Chinese. In response, the computing device can automatically switch the current input language of the device from English to Chinese.

FIG. 1 shows an exemplary method (100) for switching an input language of the computing device. At (110), an indication is received of a first language of displayed text content, where the computing device is set to a second language that is different from the first language.

At (120), a selection of a text input area is received from a user of the computing device. For example, the selection of the text input area can be a selection of a text input field on a web page or a text input box in a chat program.

At (130), upon receiving the selection of the text input area (120), the current input language is automatically switched from the second language to the first language. The automatic switching (130) can occur without any additional user interaction, and without the user having to manually switch the input language.

Once the input language has been automatically switched (130), text entered by the user will use the new input language (in this case, the first language). Therefore, if the user enters text into the text input area after the switching, it will use the first language.

Switching the input language of a computing device can involve different operations depending on the specific computing device and system software (e.g., operating system software) used by the computing device. With some computing devices, switching the current input language can comprise changing the language setting of the device (e.g., within a system settings application) and/or changing the keyboard configuration of the device (e.g., so that keys on an external or on-screen keyboard are mapped to characters of the new language).

In order to determine that the language of content displayed by a computing device is in a different language than the current input language setting of the computing device, the computing device can receive an indication of the language of the displayed content. The indication of the language of the displayed content can be received via a component (e.g., a software component, such as a local software component or an online software component) that detects the language of displayed content (e.g., detects the language of text content displayed on a web page, in a text document, in a chat window, etc.). In some implementations, the language detection component can use the Microsoft® Translator technology (e.g., as an on-line service or incorporated into software of the computing device).

In some situations, there may be no need to change the input language until the user has indicated an intention to enter text. For example, the user may be viewing web pages where the web page content is in a different language than the current input language of the device displaying the web pages. The user may continue to view web pages displayed in the different language without entering any text (e.g., without typing on the keyboard) and/or without selecting any text entry areas that may be displayed within the web pages. In this situation, the input language of the device may remain unchanged while displaying content (e.g., web page content or other text content) in the absence of text input activity on the part of the user.

Therefore, in some embodiments, automatic switching of the current input language of a computing device is performed when text input activity is detected. For example, automatic switching can be performed when it is detected that a text input area has been selected (e.g., selected by a user of the computing device). For example, the computing device can detect when a user clicks (e.g., places the cursor) in a text input area (e.g., clicks in a text entry box displayed within a web page, clicks in a text input box within a chat application, or clicks in a text entry area of a word processing document).

In some embodiments, automatic switching of the current input language of a computing device can be controlled by one or more configuration settings. The configuration settings can be used to enable or disable automatic switching. The configuration settings can also be used to control the situations in which automatic switching occurs (e.g., only perform automatic switching when specific languages are detected). In a specific implementation, a configuration setting is provided for enabling automatic switching. In this implementation, when the configuration setting is enabled, then automatic switching takes place (e.g., upon detecting that a text entry area has been selected), and when the configuration setting is disabled, automatic switching will not be performed (e.g., text entry will remain in the current language setting of the computing device regardless of the language of displayed content).

In some embodiments, automatic switching of the current input language of a computing device can take into account which languages (e.g., language options or language packages) are installed on the computing device. For example, before (or at the time of) automatically switching the input language, a check can be made to determine if the desired language is available for use as an input language.

Figure 2:
FIG. 2 is a screenshot depicting an example of automatically switching input language on a computing device.

FIG. 2 is a screenshot (200) depicting an example of automatically switching input language using a computing device (e.g., a computer, laptop, etc.). In the screenshot (200) a web page is displayed in the Chinese language. The Chinese web page is a search engine web page that contains Chinese text as well as a text input area (in this case, a text field). The screenshot (200) depicts the state of the computing device just after the user has selected the text input area (210). Prior to the user selecting the text input area (210), the computing device was configured for the English input language. Once the computing device detects that the user has selected the text input area (210), the current input language is automatically switched from English to the detected language of the web page (in this case, Chinese). The computing device also displays language settings (220) for the current input language in a system bar at the bottom of the display. In the screenshot (200), because the input language has been automatically switched to Chinese, the system bar displays Chinese language settings (220), as indicated by the "CH" designation.

Figure 3:
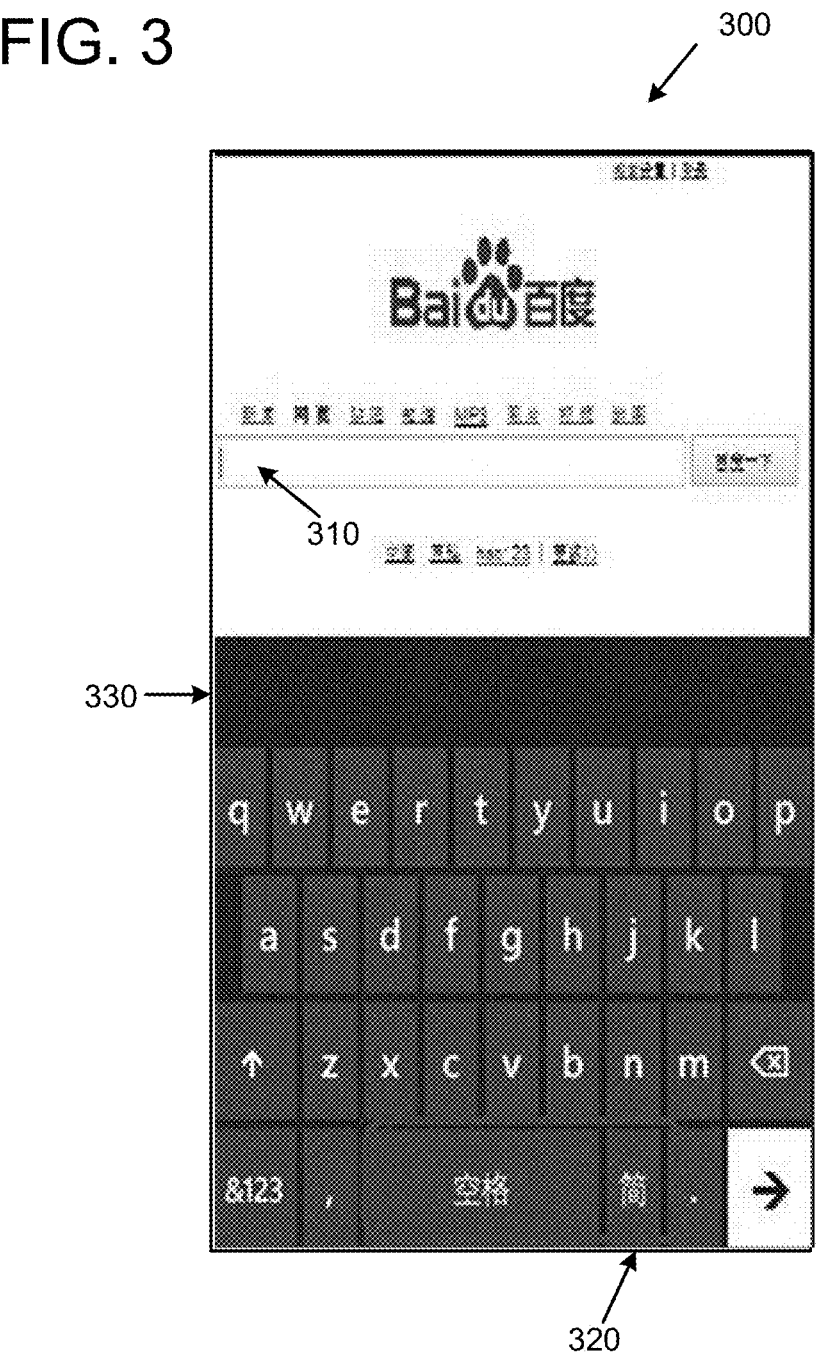
FIG. 3 is a screenshot depicting an example of automatically switching input language on a mobile computing device.

FIG. 3 is a screenshot (300) depicting an example of automatically switching input language using a mobile computing device (e.g., a smart phone, tablet computer, or other type of computing device with an on-screen keyboard). In the screenshot (300) a web page is displayed in the Chinese language. The Chinese web page is a search engine web page that contains Chinese text as well as a text input area (in this case, a text field). The screenshot (300) depicts the state of the computing device just after the user has selected the text input area (310). Prior to the user selecting the text input area (310), the computing device was configured for the English input language. Once the computing device detects that the user has selected the text input area (310), the input language is automatically switched from English to the detected language of the web page (in this case, Chinese). The computing device also displays a pop-up on-screen keyboard in the switched-to language (in this case, Chinese) in response to the detecting that the user has selected the text input area (310). The on-screen keyboard is configured for the Chinese language and includes a Chinese language settings key (320). When a user enters text using the on-screen keyboard (in this implementation, using the Latin alphabet), Chinese characters are presented in the space near the top of the on-screen keyboard (330), for selection and entry into the text entry area (310).

Automatic switching of input language can also be performed when the user is no longer interacting with content in a different language (e.g., different than a default language). For example, a computing device can be configured with a default language (e.g., a standard language that the device will use unless switching to a different language is indicated). If the user needs to input text in a language different than the default language, then the current input language can be switched while the user is inputting text and then automatically switched back afterward. For example, if the current input language is in English and the user starts a chat session with someone in Chinese, the input language can be automatically switched to Chinese while the user is chatting (e.g., while the user is entering text in the chat application). Once the user is no longer chatting (e.g., when the user selects a different application, when the user closes the chat application, and/or when the user is not actively entering text in the chat application), the current input language can be automatically switched back to the previous, or default, language (e.g., English).

Assisted Switching of Input Language

In the techniques and solutions described herein, the current input language of a computing device can be easily switched by a user. For example, a user interface element (e.g., a graphical user interface element) can be provided for selection by a user to automatically switch the current input language of a computing device (e.g., without the user having to manually change a language setting of the computing device) from a first language to a second language. The user interface element can be presented as a proposed or recommended language that the user may want to switch to (e.g., based on the language or languages of displayed text content).

In some embodiments, a user interface element is provided in proximity to a text input area for use in switching the current input language. For example, a text input box can be displayed within a web page. The text input box can be displayed with an associated user interface element (e.g., displayed in close proximity to, such as close by, next to, overlapping, or within the text input box) such as a button or link. When the user interface element is selected, the current input language is automatically switched to the language indicated by the user interface element (e.g., the name of the language can be displayed as part of the user interface element or associated with the user interface element).

In some embodiments, a user interface element is provided somewhere else within the display of the computing device. For example, the user interface element can be provided in a system toolbar area of the display. The user interface element can also be provided within an on-screen keyboard. When the user interface element is selected, the current input language is automatically switched to the language indicated by the user interface element (e.g., the name of the language can be displayed as part of the user interface element or associated with the user interface element).

In some embodiments, the user interface element is displayed in response to some type of activity (e.g., text input activity). For example, the user interface element can be displayed when it is detected that a text input area has been selected (e.g., selected by a user of the computing device). For example, the computing device can detect when a user clicks (e.g., places the cursor) in a text input area (e.g., clicks in a text entry box displayed within a web page, clicks in a text input box within a chat application, or clicks in a text entry area of a word processing document).

In some embodiments, the user interface displays a single option for automatically switching the current input language to the displayed language. For example, the device can detect that the displayed text content is in a particular language other than the current input language. The device can then display a user interface element for switching to the particular language (e.g., upon detecting that the user has selected a text input area associated with the displayed text content). In other embodiments, the user interface element can comprise one or more options for automatically switching the input language. For example, the displayed text content may comprise text in two or more different languages (e.g., one or more of them different from a current input language of the device). The device can then display a user interface element (or multiple user interface elements) for switching to one or more of the different languages that were detected within the displayed text content.

In some embodiments, displaying a user interface element for automatic switching of the current input language of a computing device can be controlled by one or more configuration settings. The configuration settings can be used to control whether user interface elements are displayed for switching the current input language and/or control the situations in which the user interface elements are displayed. For example, a configuration setting (e.g., a user-configurable setting) can be provided for turning on or off the display of user interface elements (when the setting is on, user interface elements will be displayed for switching, and when off, user interface elements will not be displayed). Configuration settings (e.g., user-configurable settings) can also be provided for specifying which languages are to display user interface elements for switching (e.g., so that the user is only prompted to switch the current input language when a language is detected in which the user is capable of entering text). For example, a user may be fluent in two languages (e.g., English and Chinese). In this situation, the user could set configuration settings such that when text content is displayed in English (and the current input language of the device is not English), then a user interface element is displayed for switching the current input language to English, and similarly when text content is displayed in Chinese (and the current input language of the device is not Chinese), then a user interface element is displayed for switching the current input language to Chinese.

Figure 4:
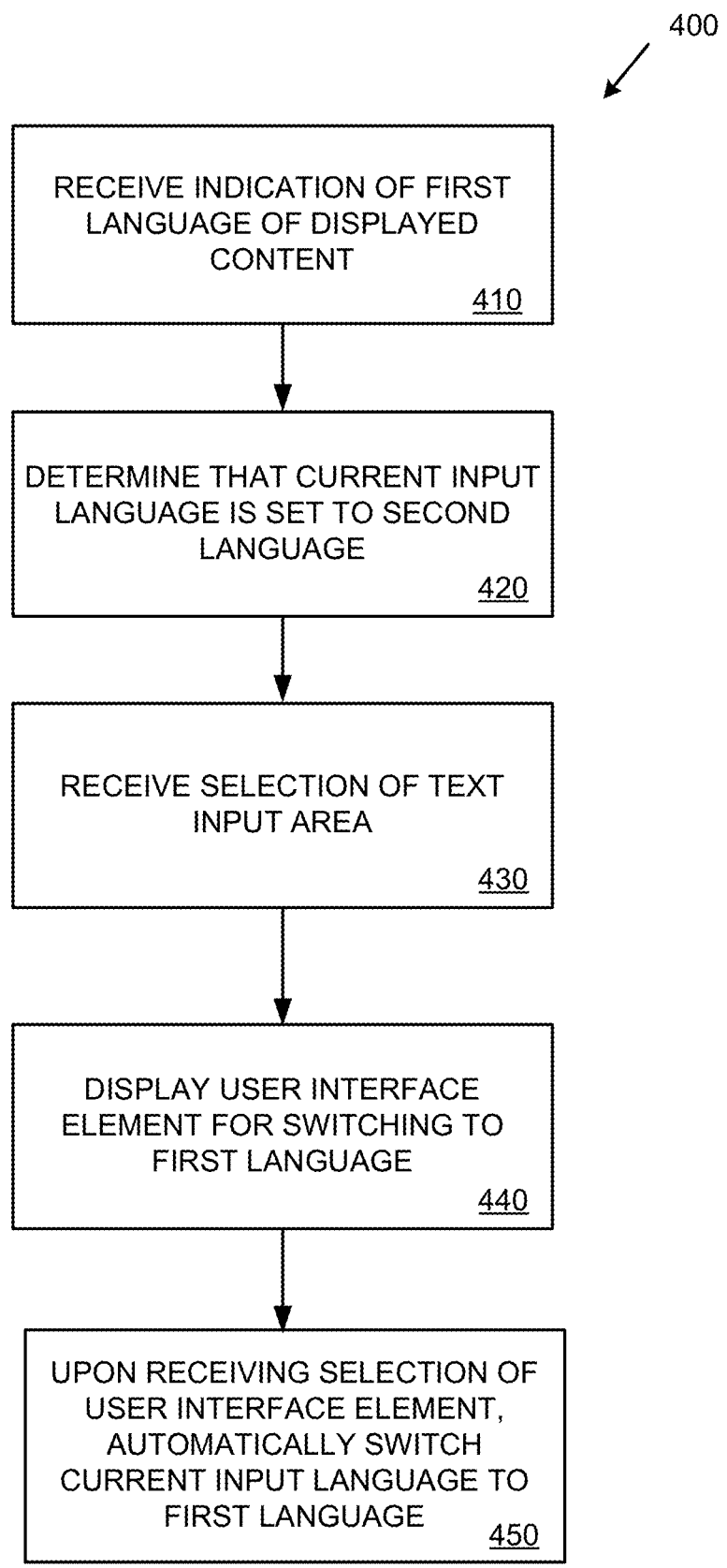
FIG. 4 is a flowchart depicting an example method for switching an input language of a computing device using a user interface element.

FIG. 4 shows an exemplary method (400) for switching an input language of the computing device using a user interface element. At (410), an indication is received of a first language of displayed text content. For example, the indication can be received based on a detected language of displayed text content, such as displayed text content within a web page, chat window, or instant message window. The indication could be received from a local language detection component or from a remote (e.g., on-line) language detection component.

At (420), the current input language is determined to be set to a second language that is different from the first language (different from the language of the displayed text content as indicated at (410)). For example, the first language could be Chinese and the second language could be English.

At (430), a selection of a text input area is received from a user of the computing device. For example, the selection of the text input area can be a selection of a text input field on a web page or a text input box in a chat program.

At (440), a user interface element is displayed for automatically switching the current input language from the second language to the first language. The user interface element can be displayed in response to, or upon, receiving the selection of the text input area (430). The user interface element can also be displayed based on other activity, such as receiving the indication of the first language of displayed text content (410) or determining that the current input language is set to a second language (420). The user interface element can be any type of user interface element that can be displayed on a graphical user interface (GUI) display of a computing device, such as a button, link, icon, graphic, etc.

The user interface element for automatically switching the current input language can be displayed (440) in a variety of ways. For example, the user interface element can be displayed in proximity to the text input area (selected at (430)) or at another location within the graphical user interface, such as a toolbar or menu area. For example, the user interface element can be displayed so that the user only has to perform a single action (e.g., a single click, tap, or other type of selection) to select the user interface element and accomplish the automatic switching of the input language.

At (450), upon receiving the selection of the displayed user interface element (440), the current input language is automatically switched from the second language to the first language. The automatic switching (450) can occur without any additional user interaction (other than the selection of the user interface element), and without the user having to manually switch the input language (e.g., using a settings menu or the like).

Once the input language has been automatically switched (450), text entered by the user will use the new input language (in this case, the first language). Therefore, if the user enters text into the text input area, it will use the first language.

Figure 5:
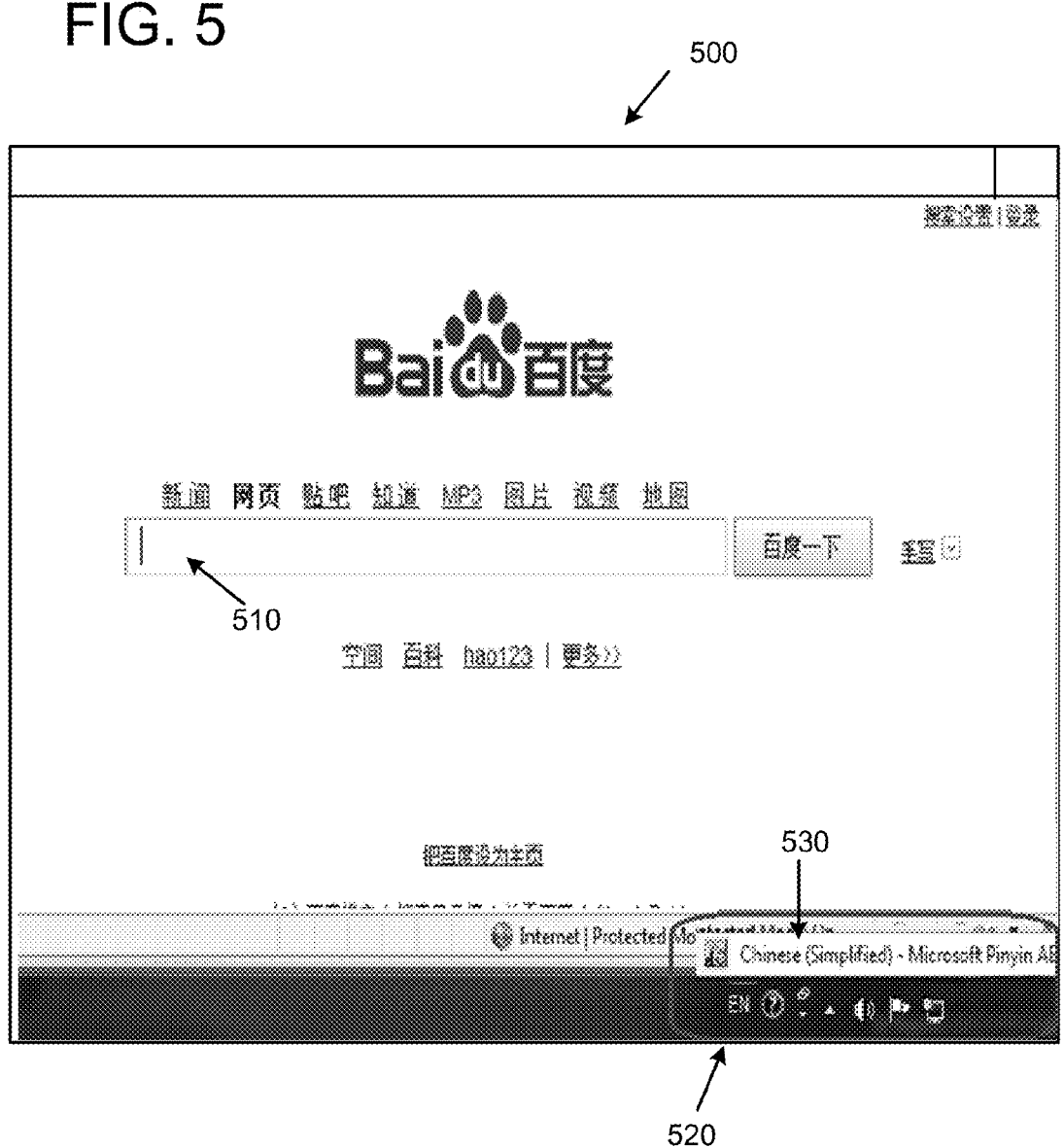
FIG. 5 is a screenshot depicting an example of providing a user interface element for switching input language on a computing device.

FIG. 5 is a screenshot (500) depicting an example of providing a user interface element for switching input language using a computing device (e.g., a computer, laptop, etc.). In the screenshot (500) a web page is displayed in the Chinese language. The Chinese web page is a search engine web page that contains Chinese text as well as a text input area (in this case, a text field). The screenshot (500) depicts the state of the computing device just after the user has selected the text input area (510). Currently, the computing device is configured to use the English language (the input language of the computing device is set to English), as indicated by the "EN" at (520).

Because the user has selected the text input area (510), a user interface element is displayed (530) for automatically switching the current input language to the language of the displayed web page content (in this case, Chinese). When the user selects the user interface element (530), the input language will be automatically changed to Chinese, and when the user enters text in the text input area (510) it will be in Chinese. Alternatively, the user interface element (530) can be displayed before the user selects the text input area (510). For example, the user interface element (530) can be displayed upon detecting that the displayed content is in a different language than the current input language (in the example displayed in (500), detecting that the displayed content in Chinese is different than the current input language of English).

In the screenshot (500), if the user does not want to enter text in Chinese, the user does not have to select the user interface element (530). In this case, the current input language would remain English, and text entered into the text input area (510) would be in English.

Figure 6:
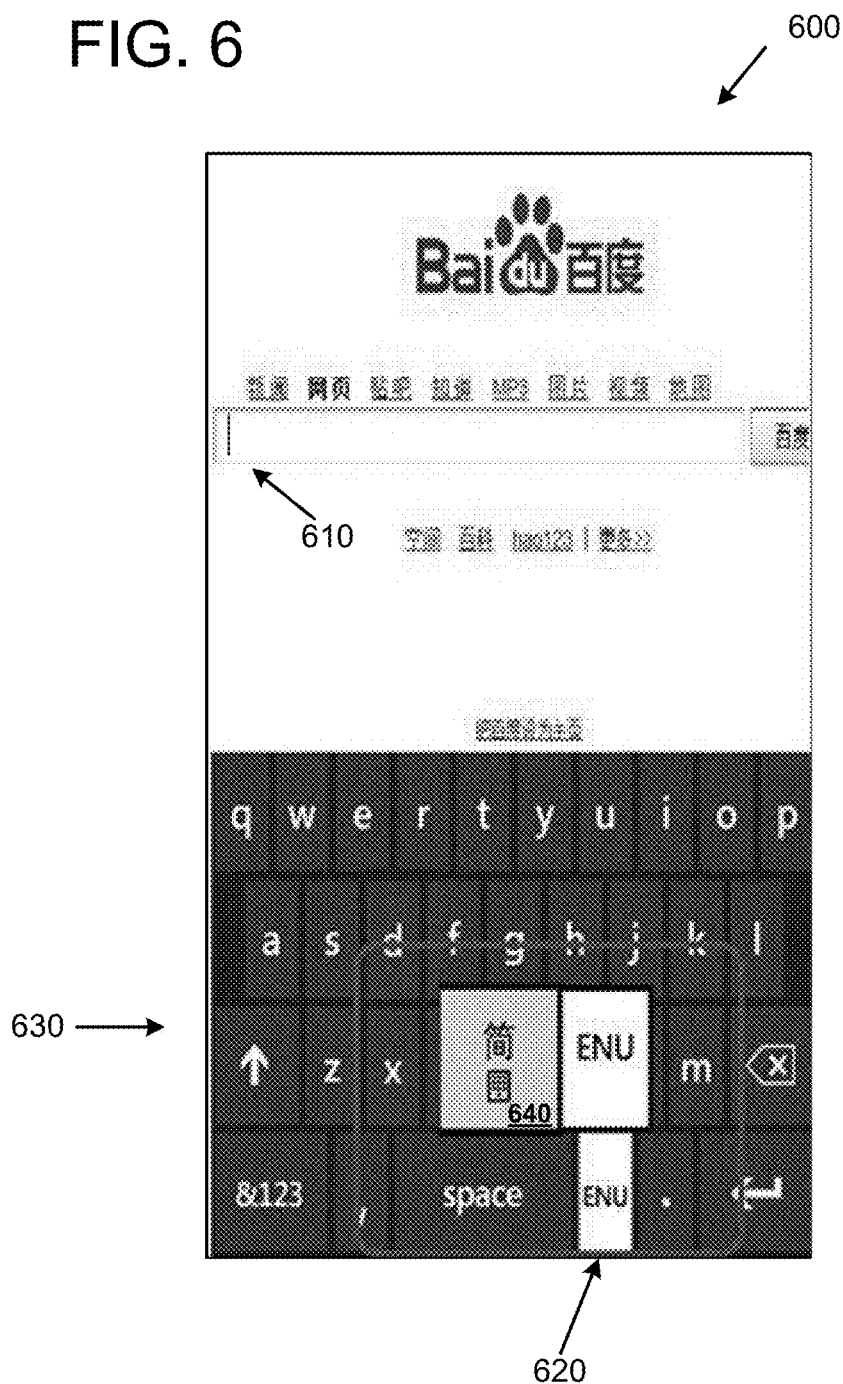
FIG. 6 is a screenshot depicting an example of providing a user interface element for switching input language using a mobile computing device.

FIG. 6 is a screenshot (600) depicting an example of providing a user interface element for switching input language using a mobile computing device (e.g., a smart phone, tablet computer, or other type of computing device with an on-screen keyboard). In the screenshot (600) a web page is displayed in the Chinese language. The Chinese web page is a search engine web page that contains Chinese text as well as a text input area (in this case, a text field). The screenshot (600) depicts the state of the computing device just after the user has selected the text input area (610). Currently, the computing device is configured to use the English language (the current input language of the computing device is set to English), as indicated by the "ENU" at (620).

Once the computing device detects that the user has selected the text input area (610), an on-screen keyboard is displayed (630). Within the on-screen keyboard (630), the current input language setting button is displayed (620) indicating that the current input setting is English ("ENU"). In addition, the input language setting button (620) has been expanded to display a user interface element (640) for switching the input language to Chinese. When the user selects the user interface element (640), the current input language will be changed to Chinese, and when the user enters text in the text input area (610) it will be in Chinese. If the user does not want to type in Chinese, the user can simply begin typing (without selecting the Chinese user interface element at (640)), which will enter text in the current input language of English. Alternatively, the user could select the "ENU" element to retain the current input language of English.

Figure 7:
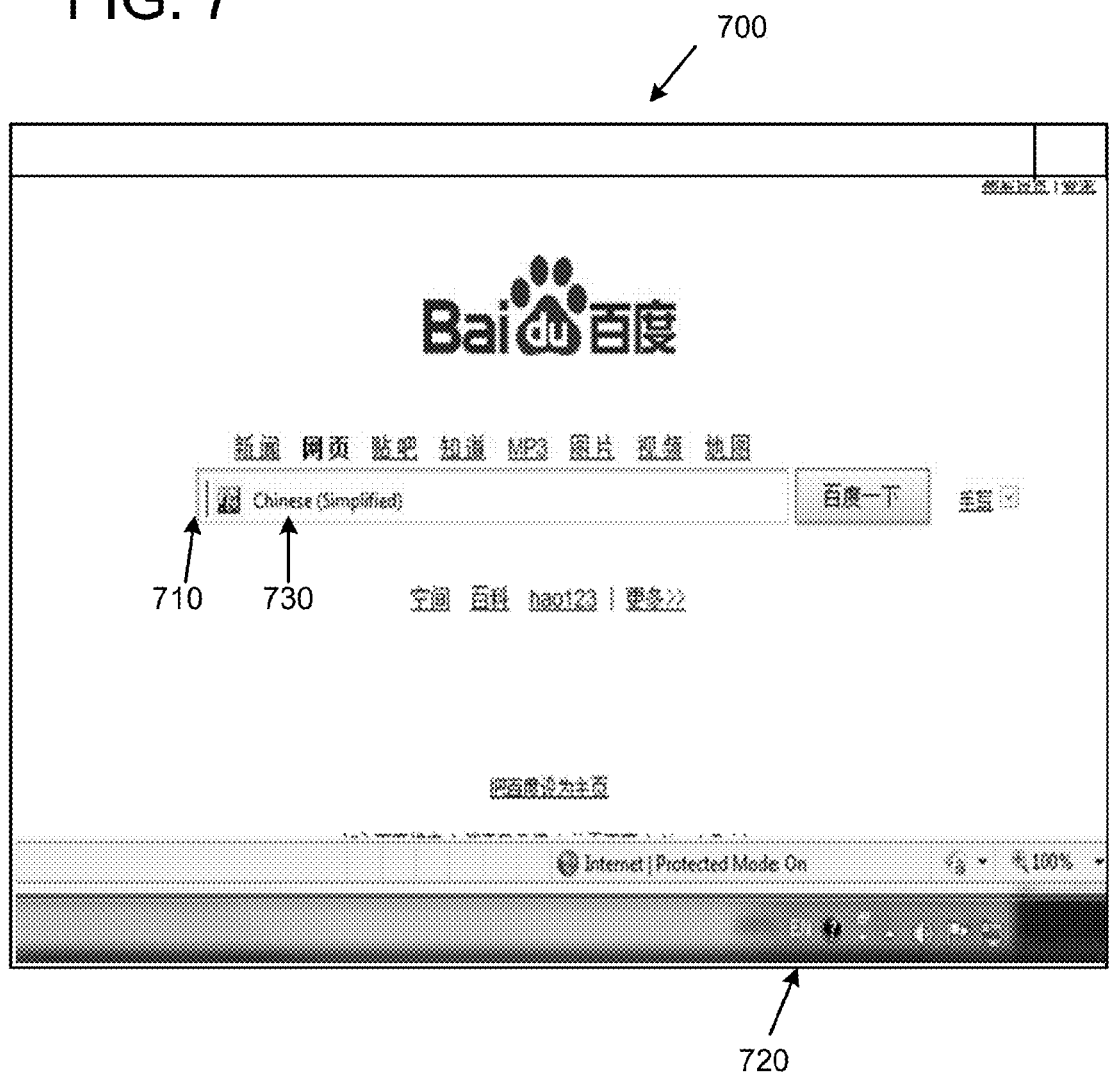
FIG. 7 is a screenshot depicting an example of providing a user interface element for switching input language on a computing device, where the user interface element is displayed in proximity to the text input area.

FIG. 7 is a screenshot (700) depicting an example of providing a user interface element for switching input language using a computing device (e.g., a computer, laptop, etc.). In the screenshot (700) a web page is displayed in the Chinese language. The Chinese web page is a search engine web page that contains Chinese text as well as a text input area (in this case, a text field). The screenshot (700) depicts the state of the computing device just after the user has selected the text input area (710). Currently, the computing device is configured to use the English language (the input language of the computing device is set to English), as indicated by the "EN" at (720).

The screen shot (700) is similar to the screenshot (500) except for the placement of the user interface element for switching the current input language. In the screenshot (700), the user interface element for switching the input language (730) is displayed in proximity to the text input area (in this case, it is displayed within the text input area).

Figure 8:
FIG. 8 is a screenshot depicting an example of providing a user interface element for switching input language using a mobile computing device, where the user interface element is displayed in proximity to the text input area.

FIG. 8 is a screenshot (800) depicting an example of providing a user interface element for switching input language using a mobile computing device (e.g., a smart phone, tablet computer, or other type of computing device with an on-screen keyboard). In the screenshot (800) a web page is displayed in the Chinese language. The Chinese web page is a search engine web page that contains Chinese text as well as a text input area (in this case, a text field). The screenshot (800) depicts the state of the computing device just after the user has selected the text input area (810). Currently, the computing device is configured to use the English language (the current input language of the computing device is set to English), as indicated by the "ENU" at (820).

Once the computing device detects that the user has selected the text input area (810), an on-screen keyboard is displayed (830). In addition, a user interface element (840) is displayed in proximity to the text input area for switching the input language to Chinese. When the user selects the user interface element (840), the input language will be changed to Chinese, and when the user enters text in the text input area (810) it will be in Chinese. If the user does not want to type in Chinese, the user can simply begin typing (without selecting the Chinese user interface element at (840)), which will enter text in the current input language of English.

Computing Device

Figure 9:
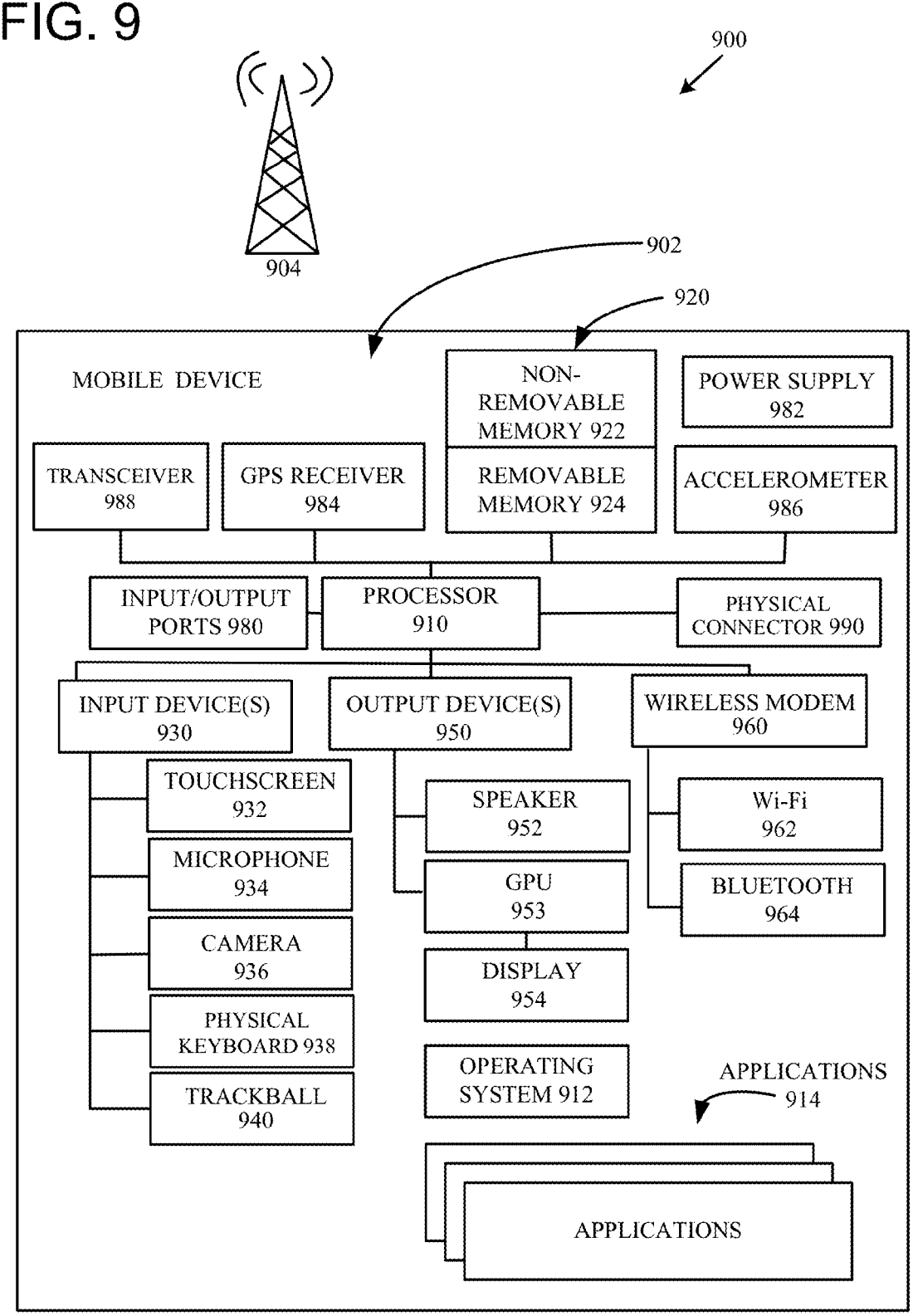
FIG. 9 is a block diagram illustrating an example mobile computing device in conjunction with which techniques and tools described herein may be implemented.

FIG. 9 depicts a detailed example of a mobile computing device (900) capable of implementing the techniques and solutions described herein. The mobile device (900) includes a variety of optional hardware and software components, shown generally at (902). In general, a component (902) in the mobile device can communicate with any other component of the device, although not all connections are shown, for ease of illustration. The mobile device can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks (904), such as a Wi-Fi, cellular, or satellite network.

The illustrated mobile device (900) includes a controller or processor (910) (e.g., signal processor, microprocessor, ASIC, or other control and processing logic circuitry) for performing such tasks as signal coding, data processing, input/output processing, power control, and/or other functions. An operating system (912) controls the allocation and usage of the components (902) and support for one or more application programs (914) such as software components that implement one or more of the innovative features described herein. In addition, the application programs can include common mobile computing applications (e.g., telephony applications, email applications, calendars, contact managers, web browsers, messaging applications), or any other computing application.

The illustrated mobile device (900) includes memory (920). Memory (920) can include non-removable memory (922) and/or removable memory (924). The non-removable memory (922) can include RAM, ROM, flash memory, a hard disk, or other well-known memory storage technologies. The removable memory (924) can include flash memory or a Subscriber Identity Module (SIM) card, which is well known in Global System for Mobile Communications (GSM) communication systems, or other well-known memory storage technologies, such as "smart cards." The memory (920) can be used for storing data and/or code for running the operating system (912) and the applications (914). Example data can include web pages, text, images, sound files, video data, or other data sets to be sent to and/or received from one or more network servers or other devices via one or more wired or wireless networks. The memory (920) can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device (900) can support one or more input devices (930), such as a touch screen (932) (e.g., capable of capturing finger tap inputs, finger gesture inputs, or keystroke inputs for a virtual keyboard or keypad), microphone (934) (e.g., capable of capturing voice input), camera (936) (e.g., capable of capturing still pictures and/or video images), physical keyboard (938), buttons and/or trackball (940) and one or more output devices (950), such as a speaker (952), a graphics processing unit (GPU) (953), and a display (954). Other possible output devices (not shown) can include piezoelectric or other haptic output devices. Some devices can serve more than one input/output function. For example, touchscreen (932) and display (954) can be combined in a single input/output device.

The mobile device (900) can provide one or more natural user interfaces (NUIs). For example, the operating system (912) or applications (914) can comprise speech-recognition software as part of a voice user interface that allows a user to operate the device (900) via voice commands. For example, a user's voice commands can be used to provide input to a map navigation tool.

A wireless modem (960) can be coupled to one or more antennas (not shown) and can support two-way communications between the processor (910) and external devices, as is well understood in the art. The modem (960) is shown generically and can include, for example, a cellular modem for communicating at long range with the mobile communication network (904), a Bluetooth-compatible modem (964), or a Wi-Fi-compatible modem (962) for communicating at short range with an external Bluetooth-equipped device or a local wireless data network or router. The wireless modem (960) is typically configured for communication with one or more cellular networks, such as a GSM network for data and voice communications within a single cellular network, between cellular networks, or between the mobile device and a public switched telephone network (PSTN).

The mobile device can further include at least one input/output port (980), a power supply (982), a satellite navigation system receiver (984), such as a Global Positioning System (GPS) receiver, sensors (986) such as an accelerometer, a gyroscope, or an infrared proximity sensor for detecting the orientation and motion of device (900), and for receiving gesture commands as input, a transceiver (988) (for wirelessly transmitting analog or digital signals) and/or a physical connector (990), which can be a USB port, IEEE 1394 (FireWire) port, and/or RS-232 port. The illustrated components (902) are not required or all-inclusive, as any of the components shown can be deleted and other components can be added.

The mobile device can determine location data that indicates the location of the mobile device based upon information received through the satellite navigation system receiver (984) (e.g., GPS receiver). Alternatively, the mobile device can determine location data that indicates location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to a map navigation tool for use in map navigation. For example, the map navigation tool periodically requests, or polls for, current location data through an interface exposed by the operating system (912) (which in turn may get updated location data from another component of the mobile device), or the operating system (912) pushes updated location data through a callback mechanism to any application (such as the map navigation tool) that has registered for such updates.

The mobile device (900) can implement the technologies described herein. For example, the applications (914) can include various components for switching a current input language of the device (e.g., detecting languages of displayed content, determining user activity, such as selection of text input areas, and automatically switching a current input language). For example, the touchscreen (932) input device can display on-screen keyboards using a number of different language settings and/or keyboard alphabets. Similarly, the physical keyboard (938) can be mapped to enter text in different languages (e.g., using different alphabets).

The mobile device (900) can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing) can be performed in the cloud.

Although FIG. 9 illustrates a mobile device (900), more generally, the techniques and solutions described herein can be implemented with devices having other screen capabilities and device form factors, such as a desktop computer, a television screen, or device connected to a television (e.g., a set-top box or gaming console). For example, a computing device such as a desktop or laptop computer may comprise many (or even all) of the components depicted in FIG. 9, but in some situations may lack some components (e.g., a transceiver 988, GPS receiver 984, and/or accelerometer 986).

Services can be provided by the cloud through service providers or through other providers of online services. Thus, the techniques and solutions described herein can be implemented with any of the connected devices as a client computing device. Similarly, any of various computing devices in the cloud or a service provider can perform the role of server computing device and deliver data to the connected devices.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable storage media include non-removable memory (922) and removable memory (924). As should be readily understood, the term computer-readable storage media does not include communication connections (e.g., 960 and 988) such as modulated data signals. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method, implemented at least in part by a computing device, for switching an input language of the computing device, the method comprising:

receiving an indication of a first language of text content displayed by the computing device, wherein a current input language of the computing device is set to a second language that is different from the first language;

receiving, from a user of the computing device, a selection of a text input area displayed by the computing device;

upon receiving the selection of the text input area, automatically switching the current input language of the computing device from the second language to the first language;

wherein text received in the text input area after the automatically switching to the first language is received in the first language;

receiving an indication that the text input area is no longer selected; and in response to the indication that the text input area is no longer selected, automatically switching the current input language back from the first language to the second language.

2. The method of claim 1 wherein the automatically switching the current input language of the computing device comprises changing a keyboard configuration and language setting of the computing device to correspond with the first language, and wherein, after the automatically switching, characters received in the text input area from the user of the computing device will use the keyboard configuration and language setting corresponding with the first language.

3. The method of claim 1 further comprising:
detecting, by the computing device, that the text content displayed by the computing device is in the first language;
wherein the text content displayed by the computing device is displayed within one of a web browser application, a chat application, and an instant message application.

4. The method of claim 1 wherein the automatically switching the current input language of the computing device from the second language to the first language comprises:
retrieving a configuration setting of the computing device indicating whether automatic switching is desired; and
determining that the configuration setting indicates that automatic switching is desired.

5. The method of claim 1 further comprising:
checking one or more language options installed on the computing device; and
based on the checking, determining, by the computing device, that the computing device is configured to support text entry in the first language.

6. The method of claim 1 wherein the text input area is associated with the text content displayed by the computing device.

7. The method of claim 1 further comprising:
receiving, from the user of the computing device, the text entered in the text input area in the first language.

8. The method of claim 1 wherein the computing device is a mobile computing device, the method further comprising:
upon automatically switching the current input language, displaying, by the mobile computing device, a pop-up keyboard in the first language, wherein text received in the text input area in the first language is received via the pop-up keyboard.

9. A computing device for switching an input language of the computing device, the computing device comprising:
a display;
a memory; and
a processing unit;
wherein the computing device is configured for performing operations comprising:
receiving an indication of a first language of text content displayed by the computing device, wherein a current input language of the computing device is set to a second language that is different from the first language;
receiving an indication of a selection of a text input area displayed by the computing device;
upon receiving the selection of the text input area, automatically switching the current input language of the computing device from the second language to the first language;
wherein text received in the text input area after the automatically switching to the first language is received in the first language;
receiving an indication that the text input area is no longer selected; and
in response to the indication that the text input area is no longer selected, automatically switching the current input language back from the first language to the second language.

10. The computing device of claim 9 wherein the automatically switching the current input language of the computing device comprises changing a keyboard configuration and language setting of the computing device to correspond with the first language, and wherein, after the automatically switching, characters entered by a user of the computing device will use the keyboard configuration and language setting corresponding with the first language.

11. The computing device of claim 9, the operations further comprising:
detecting that the text content displayed by the computing device is in the first language.

12. The computing device of claim 9 wherein the automatically switching the current input language of the computing device from the second language to the first language comprises:
retrieving a configuration setting of the computing device indicating whether automatic switching is desired; and
determining that the configuration setting indicates that automatic switching is desired.

13. A computer-readable storage media storing computer-executable instructions for execution on a computing device to perform a method for switching an input language of the computing device, the method comprising:
receiving an indication of a first language of text content displayed by the computing device;
determining that a current input language of the computing device is set to a second language that is different from the first language;
receiving, from a user of the computing device, a selection of a text input area displayed by the computing device;
upon receiving the selection of the text input area, displaying a user interface element that is selectable by the user for switching the current input language of the computing device from the second language to the first language;
upon receiving a selection of the user interface element, automatically switching the current input language of the computing device from the second language to the first language;
receiving an indication that the text input area is no longer selected; and
in response to the indication that the text input area is no longer selected, automatically switching the current input language back from the first language to the second language.

14. The computer-readable storage media of claim 13 wherein the user interface element is displayed in proximity to the text input area.

15. The computer-readable storage media of claim 13 wherein the user interface element is displayed within an on-screen keyboard.

16. The computer-readable storage media of claim 13 wherein the automatically switching the current input language of the computing device comprises changing a keyboard configuration and language setting of the computing device to correspond with the first language, and wherein, after the automatically switching, characters received in the text input area from the user of the computing device will use the keyboard configuration and language setting corresponding with the first language.

17. The computer-readable storage media of claim 13, the method further comprising:
- checking one or more language options installed on the computing device; and
- based on the checking, determining, by the computing device, that the computing device is configured to support text entry in the first language.

18. The computer-readable storage media of claim 13 wherein the text content displayed by the computing device is displayed within one of a web browser application, a chat application, and an instant message application.

19. The computer-readable storage media of claim 13 wherein the first language is Chinese and wherein the second language is English.

* * * * *